United States Patent
Perner et al.

(10) Patent No.: US 6,564,742 B2
(45) Date of Patent: May 20, 2003

(54) OVER-TEMPERATURE WARNING DEVICE

(75) Inventors: Frederick A Perner, Palo Alto, CA (US); Thomas Anthony, Sunnyvale, CA (US); Manoj Bhattacharyya, Cupertino, CA (US)

(73) Assignee: Hewlett-Packard Development Company, LLP, Houston, TX (US)

( * ) Notice: Subject to any disclaimer, the term of this patent is extended or adjusted under 35 U.S.C. 154(b) by 0 days.

(21) Appl. No.: 09/921,145

(22) Filed: Aug. 3, 2001

(65) Prior Publication Data

US 2003/0024465 A1 Feb. 6, 2003

(51) Int. Cl.[7] .............................................. G01K 11/06
(52) U.S. Cl. ...................................... 116/216; 374/160
(58) Field of Search ............................... 116/216, 217, 116/219; 206/459.1, 204; 374/160, 162

(56) References Cited

U.S. PATENT DOCUMENTS

| | | | | |
|---|---|---|---|---|
| 2,788,423 A | * | 4/1957 | Lang ........................... 337/265 |
| 3,456,614 A | * | 7/1969 | Hampton ..................... 116/218 |
| 3,645,281 A | * | 2/1972 | Seidler ........................ 132/333 |
| 4,057,029 A | * | 11/1977 | Seiter ......................... 374/106 |
| 4,072,055 A | * | 2/1978 | Elliott ........................ 374/160 |
| 4,142,151 A | * | 2/1979 | Hansen ....................... 324/767 |
| 4,428,321 A | * | 1/1984 | Arens ......................... 116/217 |
| 4,459,046 A | | 7/1984 | Spirg .......................... 374/162 |
| 4,573,574 A | * | 3/1986 | Connery ..................... 206/726 |
| 4,601,588 A | * | 7/1986 | Takahara et al. ............ 374/106 |
| 4,753,188 A | * | 6/1988 | Schmoegner ................ 116/217 |
| 4,860,143 A | * | 8/1989 | van Blerk ................... 360/133 |
| 5,057,434 A | * | 10/1991 | Prusik et al. .................. 436/2 |
| 5,234,104 A | * | 8/1993 | Schulte et al. .............. 206/714 |
| 5,285,895 A | * | 2/1994 | Bolt ........................... 206/709 |
| 5,293,996 A | * | 3/1994 | Duncan ..................... 206/459.1 |
| 5,471,040 A | | 11/1995 | May ........................... 235/451 |
| 5,607,059 A | * | 3/1997 | Kitamura et al. ........... 206/720 |
| 5,622,137 A | | 4/1997 | Lupton, Jr. et al. ......... 116/217 |
| 5,667,303 A | * | 9/1997 | Arens et al. ................. 374/102 |
| 5,673,028 A | * | 9/1997 | Levy .......................... 340/635 |
| 5,776,371 A | * | 7/1998 | Parker ........................ 252/502 |
| 5,779,364 A | * | 7/1998 | Cannelongo et al. ....... 374/160 |
| 5,875,892 A | * | 3/1999 | Martin et al. ............. 206/459.1 |
| 5,936,508 A | * | 8/1999 | Parker ........................ 337/241 |
| 5,954,010 A | | 9/1999 | Bullock et al. ............. 116/217 |
| 5,990,199 A | | 11/1999 | Bealing et al. ............. 523/161 |
| 5,997,927 A | * | 12/1999 | Gics ........................... 426/383 |
| 6,103,351 A | * | 8/2000 | Ram et al. .................. 428/195 |
| 6,292,087 B1 | * | 9/2001 | Castonguay et al. ........ 337/206 |

OTHER PUBLICATIONS

Omega Engineering, Inc. Product Catalog, pp. F–4, F–8 and F–9, (date unknown).

* cited by examiner

Primary Examiner—Christopher W. Fulton
Assistant Examiner—R. Alexander Smith

(57) ABSTRACT

A critical temperature warning apparatus and method to monitor the thermal history of a product such as a memory card. The apparatus comprises a critical temperature indicator, which is externally attached to a product to be monitored. The indicator indicates if the product has experienced a critical temperature. The critical temperature indicator may comprise a patterned array of wax, the wax having a melting point equal to the critical temperature. If the pattern of wax has been destroyed leaving a molten wax residue, then this indicates that the product has experienced a critical temperature. The critical temperature indicator may also include thermographic inks for indicating that a critical temperature has been experienced.

17 Claims, 4 Drawing Sheets

OVER-TEMPERATURE WARNING DEVICE

FIELD OF THE INVENTION

This invention relates generally to a temperature indicating arrangement, and more particularly to a temperature indicating arrangement for indicating that a product has reached a critical temperature.

BACKGROUND OF THE INVENTION

Many electronic components are usually affected by harmful changes in temperature. For example, electronic memory devices are manufactured by thin film processes. These processes typically utilize temperature sensitive manufacturing. These manufacturing processes also involve the laying down of metal or organic material. Generally, once the metal or organic material has been laid, the memory device is no longer able to withstand temperatures above a critical temperature. When the temperature rises above a critical level, metal laid in the low temperature manufacturing process may melt, one or more thin layers may alter characteristics, different materials may inter-diffuse, and organic material may break down. If this damage goes undetected, the use of these components may lead to defective performance, which can be harmful. As a result, it has become necessary to monitor the environmental conditions in which such electronic instruments are used and stored.

One type of electronic memory device affected adversely by rising temperatures is the MRAM (Magnetic Random Access Memory) device. MRAM memory devices may exist as a single chip or may be packaged as a collection of chips. As such, this technology may be packaged inside a computer system or may be employed as a removable card such as a PCMCIA card. In the manufacture of these devices, low temperature assembly and low temperature processes must be used to prevent the MRAM device from being exposed to excessive temperatures. MRAMs typically include nickel iron magnets that are permanently magnetized in one direction, and if the temperature exceeds 200–250 degrees Celsius, the magnet will lose its permanent polarization and the data will be unreliable. Therefore these components should not be used if they are exposed to such critical temperatures. It is important for a user to know or to guarantee that this part has not experienced an over-temperature.

In general, devices that monitor the temperature of temperature sensitive elements are known. For example, U.S. Pat. No. 5,954,010 teaches a temperature-sensing device for permanently indicating when a product is exposed to critical temperatures. This patent teaches a temperature-indicating device that changes shape according to the temperature. The disclosure teaches the use of the temperature-indicating device for monitoring a battery. The disclosure also teaches the use of the temperature-indicating device for monitoring computers, electronics, and power systems.

A possible disadvantage of this invention is that the temperature-monitoring device cannot be physically attached to the product per se, but only to the package encasing the product. Therefore there is no option to directly attach to the product that is being monitored. Also, the temperature-indicating device is cumbersome and cannot be used with smaller components. Another possible disadvantage is that the temperature-monitoring device of U.S. Pat. No. 5,954,010 involves the use of mechanical elements that require precision among various cooperating elements in order to work properly.

Another known temperature monitoring device is disclosed in U.S. Pat. No. 4,459,046. This patent teaches a self-adhesive temperature indicator for indicating the temperature of a body. It is not known what types of bodies this indicator is most suitable for, however, generally it is known to use adhesive temperature indicators for monitoring temperatures. It is also known to use adhesive temperature indicators to monitor the temperature of personal computer board components in electronic circuits. However, it is not generally known to use adhesive indicators to monitor replaceable memory cards such as MRAM cards.

With respect to memory cards, it is known to use electronic systems to electronically monitor the temperature. These devices store the thermal data using electronic memory devices, which may involve the use of a display, such as an LED or LCD, to indicate the temperature history. One possible disadvantage of these electronic monitoring devices it that they tend to be expensive. Another disadvantage is that these monitoring devices cannot be easily attached and detached from the device that is being monitored. Also, these electronic monitoring devices do not operate independently of the device being monitored. For instance, U.S. Pat. No. 5,471,040 teaches a capacitive data card system that has a blow fuse that changes color when elevated beyond a particular temperature. The fuse is a part of the operating system, and therefore does operate independently.

SUMMARY OF THE INVENTION

In one respect, the invention is a temperature warning arrangement. The arrangement comprises a memory device and a temperature indicator. In this respect, the temperature indicator comprises a wax-based substance arranged in a pattern. The wax-based substance has a melting point at a predetermined temperature. Also, the wax-based substance is externally attached to the memory device. In this respect, the operation of the temperature indicator is independent of operation of the memory device.

In another respect, the invention is a temperature warning arrangement. The temperature warning arrangement comprises a memory device and a multi-layered structure. In this respect, the multi-layered structure comprises an adhesive paper backing and a patterned layer. The patterned layer has a pattern. Also in this respect, the patterned layer is on the adhesive paper backing. The temperature warning arrangement also includes a transparent temperature sensitive layer laid over the patterned layer so that the pattern is visible there through. The transparent temperature sensitive layer changes visible characteristics at the predetermined temperature such that at the predetermined temperature the temperature sensitive layer obscures the visibility of the pattern.

In another respect, the invention is a method of monitoring the thermal history of a memory device. In this respect the method comprises, providing, on the exterior of the memory device, a temperature indicator. The temperature indicator comprises a wax material, wherein the wax material melts at a predetermined temperature. The method of monitoring the thermal history of the memory device also includes the step of monitoring the temperature indicator to see if the wax material has melted.

In another respect, the invention is a temperature indicator for use with a temperature sensitive product. The indicator comprises a paper backing and a patterned layer having a pattern wherein the patterned layer is placed on the paper backing. The temperature indicator also includes a transparent layer laid over the patterned layer so that the pattern is visible through the transparent layer. In this respect, the transparent layer changes visible characteristics at a predetermined temperature so as to obscure the visibility of the pattern.

In comparison to known prior art, certain embodiments of the invention are capable of achieving certain advantages including some or all of the following. One advantage is the simplicity of the method for producing a less expensive temperature-monitoring device. Also the use of waxes for indicating critical temperatures is advantageous because it is inexpensive, readily available and easily manipulated. Another advantage is the flexibility of use offered by this temperature-monitoring device. Because of its unobtrusive size and its application with regular label paper, the temperature-monitoring device can be easily fixed to temperature sensitive components of all sizes. Additionally, the operation of the temperature-monitoring device is wholly independent of the operation of the temperature sensitive device, thereby simplifying the operation and also making it more reliable. These and other advantages will be apparent to those skilled in the art upon reading the following detailed description of preferred embodiments, with reference to the below listed drawings.

DETAILED DESCRIPTION OF THE PREFERRED EMBODIMENTS

Figure 1:
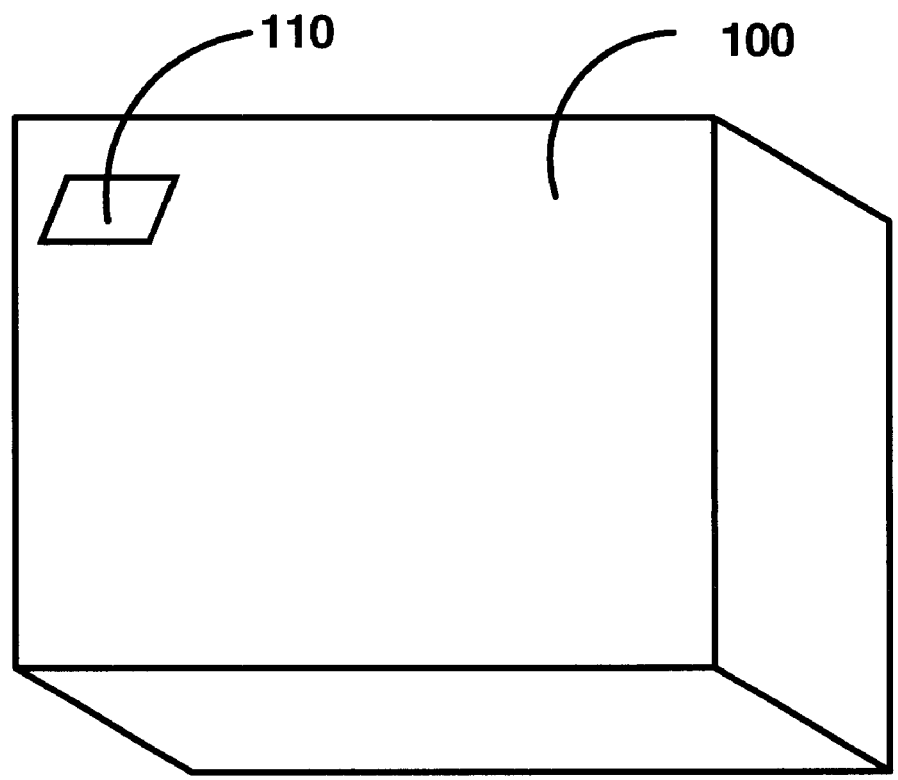
FIG. 1 is a perspective view of a package with a critical temperature indicator affixed, according to one embodiment of the invention.

FIG. 1 is a perspective view of a package 100 to which a critical temperature indicator 110 may be affixed. FIG. 1 shows a package 100, for holding a temperature sensitive item or items. The temperature sensitive item(s) may be electronic equipment. This includes memory devices such as integrated circuit elements or PCMCIA (Personal Computer Memory Card International Association) and MRAM cards and the like. The package 100 may also carry other known temperature sensitive items or components.

Figure 2A:
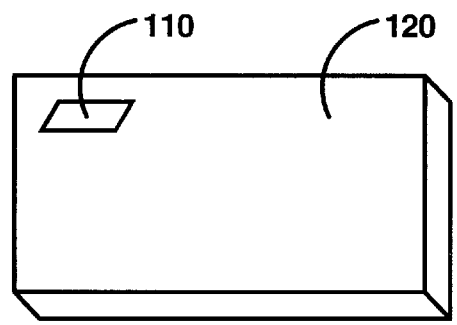
FIG. 2A is a perspective view of an MRAM memory card with a critical temperature indicator affixed, according to one embodiment of the invention.

FIG. 2A is a perspective view of a memory card or chip 120 with a critical temperature indicator 110 affixed thereto. The memory card 120 may be a MRAM card or a PCMCIA card or any other electronic card or electronic part such as an integrated circuit. A critical temperature indicator 110 is attached to the card 120.

Figure 2B:
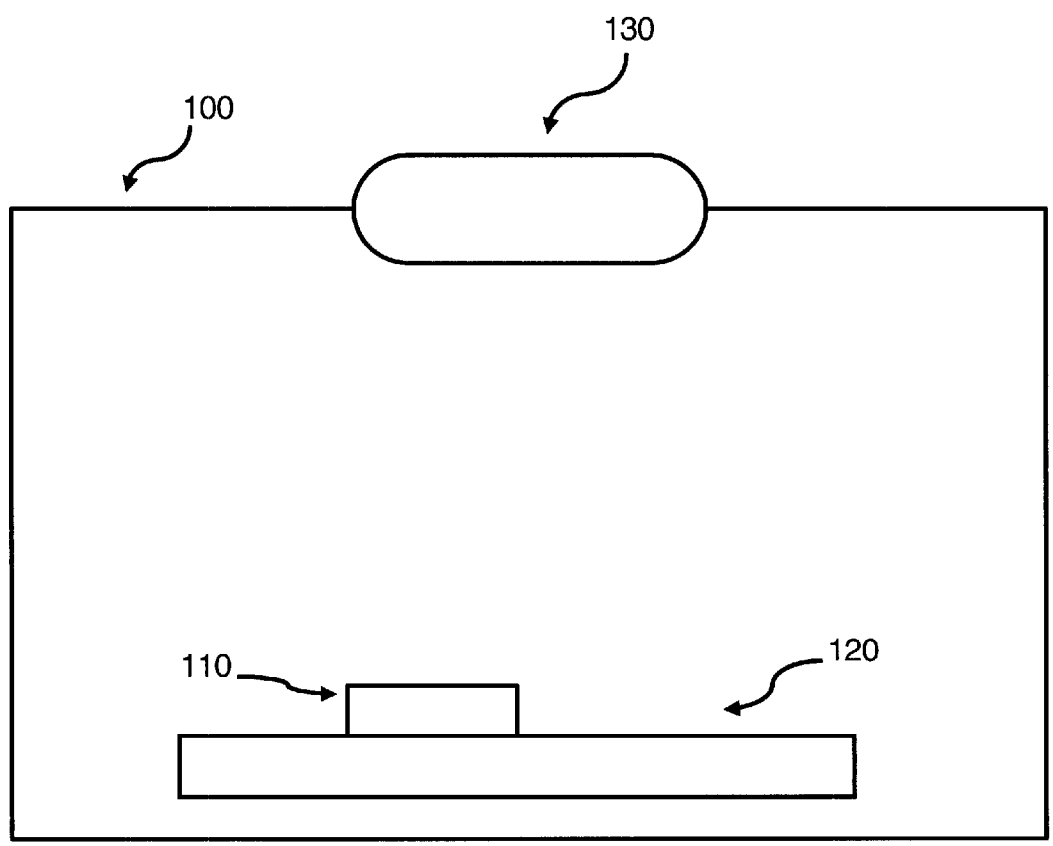
FIG. 2B is a cross-sectional view of a package with a viewing window.

FIG. 2B is a cross-sectional view of a package with a viewing window. In this embodiment, the memory card or chip 120 with an attached temperature indicator 110 may be held in a package 100. In this instance, the indicator is made visible via a window 130 on the package 110 allowing a user viewing access. The window 130 may be a magnifying glass to enhance the visibility of the indicator. It should be noted that the package 100 might be an electronic packages such as a form factor packaging enclosing a memory chip 120 such as an MRAM chip.

The critical temperature indicator 110 is preferably a simple device. Basically, it comprises a wax-based substance that melts when it experiences a critical temperature. Generally, the wax-based substance has a formula $C_nH_{(2n+2)}$, with chains containing 18–36 carbon atoms. Known waxes and wax-based substances such as Beeswax, Candelilla wax, Carnauba wax, Ceresin, Cerumen, Fats and Glyceridic oils, Bayberry, Japan wax, Montan wax, Ozocerite, Paraffin waxes and Hydrocarbon waxes, Wool wax, Lanolin, and Moellon degras, may be used in this invention. Different combinations of different waxes may be used to manufacture the wax-based substances used in the temperature indicator 110. The wax-based substance is manufactured so that it has a specific melting point, say 200 degrees Celsius, according to techniques well known in the art. The manufactured melting point of the wax-based substance corresponds with the critical temperature or slightly less than the critical temperature of the product being monitored. Therefore, if the critical temperature indicator 110 is used to monitor the temperature of the MRAM card 120, and the card 120 has a critical temperature of 200 degrees Celsius, then the wax-based substance in the indicator is manufactured to have a melting point of 200 degrees Celsius. Therefore the wax melts at this critical temperature, signaling that this temperature has been reached. Because the critical temperature indicator is visibly located on the product being monitored, the molten wax on the indicator is used as a warning to the user. This indicates that the product has experienced a critical temperature, and it should not be used.

The wax-based substance may have a melting point at another desired temperature different from the critical temperature. For instance, if it is desired to monitor a product at a temperature of say, 10 degrees Celsius below a critical temperature, i.e., a non-critical temperature, then the wax based substance can be manufactured to melt at this non-critical temperature. Therefore, the critical temperature indicator can be used to monitor any predetermined temperature within the scope of the invention.

Figure 3:
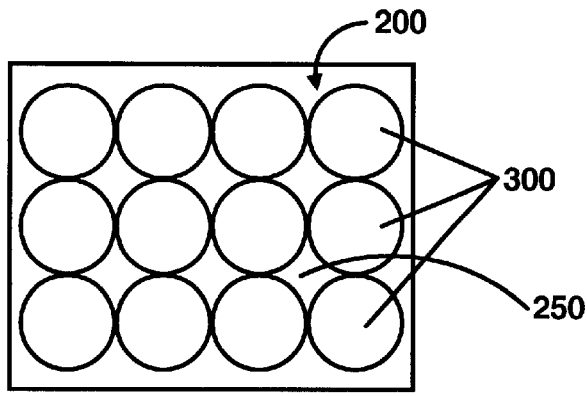
FIG. 3 is a perspective view of a first arrangement for the critical temperature indicator according to an embodiment of the invention.

FIG. 3 is a perspective view of a first arrangement for the critical temperature indicator 110. As illustrated in FIG. 3, the indicator 110 includes an array of wax circles 300. The wax circles 300, which may comprise a wax-based substance, are printed on a paper backing 200. The side of the paper backing 200 that does not have the wax circles 300 circles may have an adhesive. As a result, the paper backing 200 may be attached to a foreign surface. Alternatively, the paper backing may be attached to a foreign surface by means of adhesive properties such as static charges or surface tension. The paper backing 200 may have a thickness and thermal conductivity such that it readily conducts heat. The wax circles 300 do not completely cover the paper backing 200. There are blank spaces 250 on the paper backing. The blank spaces 250 are the places on the paper label with no wax substance, as illustrated in FIG. 3. There preferably is a visual contrast between these blank spaces 250 and the wax circles 300. So long as the critical temperature indicator maintains the original wax pattern, it is assumed that the critical temperature, or any other predetermined temperature, has not been experienced. In the design illustrated in FIG. 3, when the critical temperature indicator experiences a critical temperature or any other predetermined temperature, the wax circles 300 melt and creep into the blank spaces 250, thereby covering them. The destruction of the original wax pattern is an indication that the critical temperature or any other predetermined temperature has been reached or exceeded.

Figure 4:
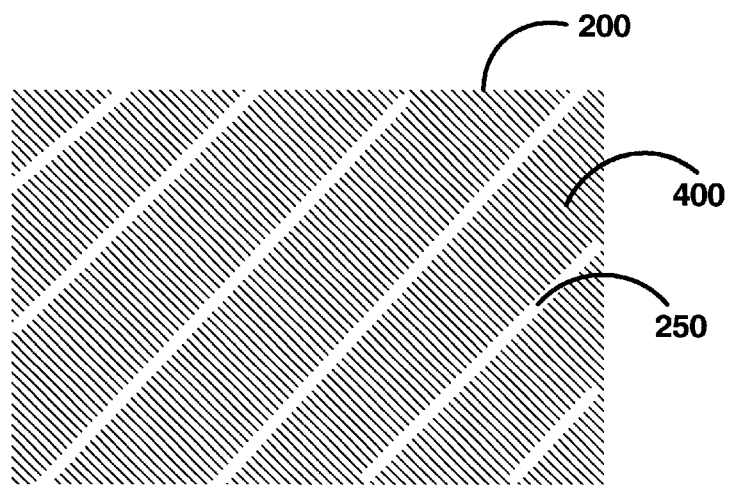
FIG. 4 is a perspective view of an alternative arrangement for the critical temperature indicator according to an embodiment of the invention.

FIG. 4 is a perspective view of an alternative arrangement for the critical temperature indicator 110. As illustrated in FIG. 4, the indicator 110 includes an array of wax stripes 400. The wax stripes 400, which may comprise a wax-based substance, are printed on an adhesive paper backing 200. The side of the paper backing 200 that does not have the wax stripes 400 may have an adhesive. As a result the paper backing 200 may be attached to a foreign surface. Alternatively, the paper backing may be attached to a foreign surface by means of adhesive properties such as static charges or surface tension. Between successive wax stripes 400 are blank spaces 250, which are the areas on the paper label that do not have any wax thereon. As with the arrangement illustrated in FIG. 3, when the indicator of FIG. 4 reaches a critical temperature, the wax stripes 400 melt, and the wax creeps into the blank areas 250 and covers the spaces. The destruction of the striped wax pattern indicates to a user that the critical temperature has been reached or exceeded.

Figure 5:
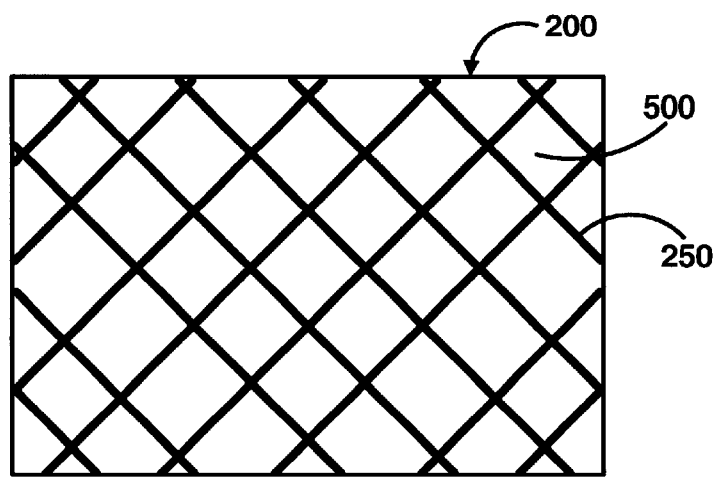
FIG. 5 is a perspective view of an alternative arrangement for the critical temperature indicator according to an embodiment of the invention.

FIG. 5 is a perspective view of another alternative arrangement for the critical temperature indicator 100. In this arrangement, the indicator 110 comprises an array of wax squares 500, which may comprise of a wax-based substance. As the case with the above described indicator arrangements, the critical temperature indicator 110 illustrated in FIG. 5 includes blank spaces 250. Also as described above, when the indicator experiences a critical temperature, the wax squares 500 melt and creep onto the blank spaces 250. This indicates that the critical temperature has been reached or exceeded.

In the illustrations of FIGS. 3–5, the melted wax on the indicator 110 warns a user that the product or device being monitored should not be used because it has experienced a critical temperature or any other predetermined temperature. In order to have the melted wax pattern more easily recognizable, the background on the label paper may be of a color that substantially contrast with the color of the wax substance. Therefore, after printing the wax patterns, the blank spaces 250, which carry the background color, contrast with the wax patterns 300, 400, or 500. For example, the wax pattern may be black and the top surface of the paper backing 200 may be white, or vice versa. In this variation, when the wax substance melts and covers the blank spaces 250, the wax also covers the contrasting background color, making the change in state of the indicator 110 more distinguishable and noticeable to the user. Alternatively, the patterns may also be more noticeable if they were printed directly onto the product being monitored, as opposed to being printed on a paper label. There, the printed wax patterns may be printed directly onto the package 100 or the device 120.

Figure 6A:
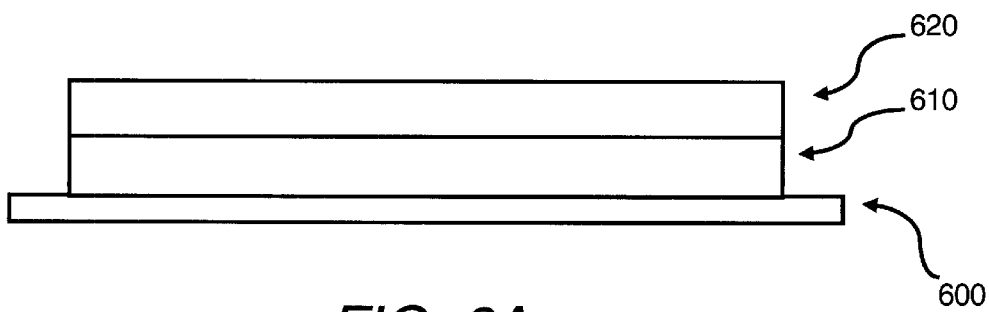
FIGS. 6A–6C show a preferred embodiment for a critical temperature indicator.
Figure 6B:
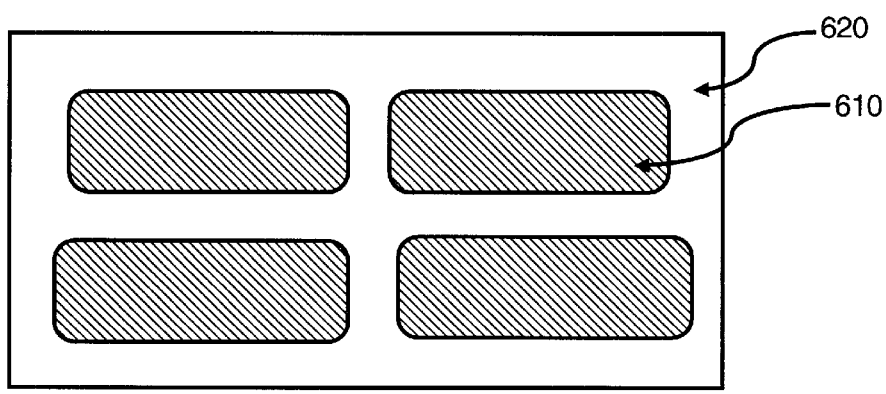
Figure 6C:
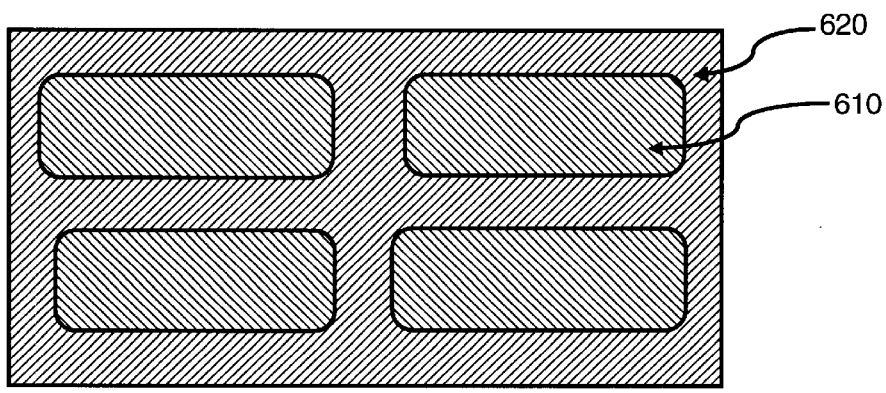

FIGS. 6A–6C show a preferred embodiment for the critical temperature indicator. FIG. 6A shows a cross sectional view of the critical temperature indicator. The figure shows a bottom layer 600 which may be an adhesive paper backing. A pattern 610 is printed on top of the paper backing 600. The bottom side of the paper backing 600 may have an adhesive. As a result, the paper backing 600 may be attached to a foreign surface. Alternatively, the paper backing may be attached to a foreign surface by means of adhesive properties such as static charges or surface tension. As illustrated in FIG. 6A, a temperature sensitive layer 620 is printed on top of the pattern 610. In this embodiment, the temperature sensitive layer 620 is transparent so that the pattern 610 is clearly visible through the temperature sensitive layer. FIG. 6B shows a top view of the arrangement. The pattern 610 may be a company Logo. However, it should be understood that the pattern 610 could be any reasonable pattern within the scope of the invention.

FIG. 6C shows a top view of the arrangement after a critical temperature has been reached. At a predetermined critical temperature, the temperature sensitive layer 620 undergoes a change in visible characteristics. When the layer 620 changes, there is a resulting permanent visible distortion of the underlying pattern 610. This distortion reduces the sharpness of the underlying pattern 610 indicating to a user that the indicator has experienced a critical temperature.

The temperature sensitive layer 620 may be a wax-based layer. The wax-based layer is manufactured to melt at a predetermined critical temperature. When the wax layer 620 melts, it changes crystalline structure that results in a permanent visible distortion of the underlying pattern 610.

Alternatively, the temperature sensitive layer 620 may be an indicator material made from thermographic ink that absorbs heat and undergoes an irreversible color change. The irreversible thermographic ink generally contains some inorganic pigments, soluble glass as a binder, and fine particles of silica. These inks are commercially available and known to persons in the art. The ink layer may be painted on the pattern 610 with known devices such as ink jet printers and the like. The ink layer may be manufactured to undergo the irreversible color change at a predetermined temperature, i.e., the critical temperature. When the ink layer changes color there is a resulting permanent visible distortion of the underlying pattern 610.

In a variation of the above-described embodiments, transparent coatings may be applied over the wax-based substances (300, 400, 500) and over the temperature sensitive layer 620 described herein. The transparent coating may serve as a protective coating to improve the durability of the temperature indicators. Furthermore, the transparent coating overlying the wax-based substances may also serve to enhance the visibility of the wax patterns 300, 400, and 500 so that it is easier for the user to tell if the product being monitored has exceeded a critical temperature. With regards to the coating, any transparent glue like household cement, transparent epoxy and paintable substance such as varnish may be used.

What has been described and illustrated herein are preferred embodiments of the invention along with some variations. The terms, descriptions and figures used herein are set forth by way of illustration only and are not meant as limitations. In general, other wax patterns may be used for indicating critical temperatures. In addition to wax-based substances, other wax-like organic or inorganic substances may be used to produce the same effect as the wax described herein above. Also, other products including other electronic components and packages may employ these temperature indicators. This apparatus and method may be used to monitor the temperatures of non-electronic products. Those skilled in the art will recognize that these and many other variations are possible within the spirit and scope of the invention, which is intended to be defined by the following claims and their equivalents, in which all terms are meant in their broadest reasonable sense unless otherwise indicated.

What is claimed:

1. A temperature warning arrangement comprising:
   a memory device;
   a temperature indicator comprising:
      a wax-based substance arranged in a pattern, wherein the wax-based substance has a melting point at a predetermined temperature, and wherein the wax-based substance is externally attached to the memory device, wherein the pattern of wax-based substance is arranged in a spaced apart pattern, such that successive deposits of the wax-based substance are separated by empty spaces and wherein at the predetermined temperature, the wax-based substance merges into the empty spaces between the successive deposits of the wax-based substance; and
   wherein the operation of the temperature indicator is independent of operation of the memory device.

2. The temperature warning arrangement of claim 1 wherein the memory device is an MRAM card.

3. The temperature warning arrangement of claim 1 wherein the memory device is an MRAM chip.

4. The temperature warning arrangement of claim 3 further comprising a transparent coating over the wax-based substance.

5. The temperature warning arrangement of claim 1 wherein the pattern of wax-based substance is arranged on an adhesive paper backing.

6. The temperature warning arrangement of claim 5 wherein the adhesive paper backing has a color background and the pattern of wax-based substance contrasts with the color background and at the predetermined temperature, the merged wax-based substance conceals the color background of the adhesive paper backing.

7. The temperature warning arrangement of claim 1 further comprising a form factor package wherein the memory device is held within the form factor package, and the form factor package comprises a window on an external surface for viewing the temperature indicator on the memory device.

8. A temperature warning arrangement comprising:
   a memory device;
   a multi-layered structure comprising:
      an adhesive paper backing;
      a patterned layer having a pattern wherein the patterned layer is on the adhesive paper backing; and
      a transparent temperature sensitive layer laid over the patterned layer so that the pattern is visible there through, and wherein the transparent temperature sensitive layer comprises a wax-based layer wherein the wax-based layer has a melting point at the predetermined temperature such that at the predetermined temperature, the wax melts and obscures the visibility of the pattern.

9. The temperature warning arrangement of claim 8 wherein the memory device is an MRAM card.

10. The temperature warning arrangement of claim 8 wherein the memory device is an MRAM chip.

11. The temperature warning arrangement of claim 8 further comprising a transparent coating over the transparent temperature sensitive layer.

12. The temperature warning arrangement of claim 8 wherein the transparent temperature sensitive layer comprises an ink layer wherein the ink layer undergoes an irreversible color change at the predetermined temperature such that at the predetermined temperature the ink obscures the visibility of the pattern.

13. A method of monitoring the thermal history of a memory device, the method comprising:
   providing, on the exterior of the memory device, a temperature indicator comprising a wax material, wherein the wax material is manufactured to melt at a predetermined temperature;
   laying a patterned layer with a pattern on a paper backing;
   laying the wax material layer over the patterned layer, wherein the wax material is transparent; and
   applying the paper backing to the memory device; and
   wherein the wax material is manufactured to melt and thereby obscure the underlying pattern in the patterned layer.

14. The method of claim 13 wherein the step of providing the temperature indicator further comprises:
   printing a pattern of the wax material on a paper label wherein the wax material is printed in a spaced apart relationship so that successive deposits of wax material are separated by empty spaces, and
   attaching the paper label to the temperature sensitive part.

15. The method of claim 14, wherein the wax material is manufactured to merge in the spaces between successive deposits of wax.

16. The method of claim 13 wherein the memory device is an MRAM card.

17. The method of claim 14 Wherein the memory device is an MRAM chip.

* * * * *